(12) United States Patent
Lin et al.

(10) Patent No.: US 7,509,710 B1
(45) Date of Patent: Mar. 31, 2009

(54) DAMPER APPARATUS

(75) Inventors: Ming-Han Lin, Taipei Hsien (TW); Te-Hung Yin, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/022,004

(22) Filed: Jan. 29, 2008

(51) Int. Cl.
*E05C 17/64* (2006.01)
(52) U.S. Cl. .................. 16/337; 188/290; 188/71.5
(58) Field of Classification Search .............. 16/337; 188/290, 71.5; 192/58.41, 58.42, 70.19
See application file for complete search history.

(56) References Cited

U.S. PATENT DOCUMENTS

| | | | | |
|---|---|---|---|---|
| 4,938,322 A * | 7/1990 | Sugasawara et al. | ........ | 188/290 |
| 6,952,860 B2 * | 10/2005 | Kawamoto | ........ | 16/285 |
| 7,031,466 B2 * | 4/2006 | Lu et al. | ........ | 379/433.13 |
| 7,258,208 B1 * | 8/2007 | Dennis et al. | ........ | 188/170 |
| 7,299,524 B2 * | 11/2007 | Luo | ........ | 16/303 |
| 2003/0126717 A1 * | 7/2003 | Iwashita | ........ | 16/82 |

* cited by examiner

*Primary Examiner*—Victor Batson
*Assistant Examiner*—Matthew Sullivan
(74) *Attorney, Agent, or Firm*—WPAT, PC; Anthony King

(57) ABSTRACT

A damper apparatus includes a stationary housing defining a cavity. A damper body rotatablely installed in the cavity has a head protruding to form a cylindrical guiding portion and a pushing portion defining two side ends apart from each other and rotatable sheets and stationary sheets are respectively received in the cavity and alternately disposed on the guiding portion and the pushing portion. The stationary sheets are fixed to the stationary housing. Each of the rotatable sheets protrudes inwardly to form a retaining portion. The two side ends of the pushing portion alternately engage the retaining portions and at least two of the retaining portions are different in width so as to make the side end of the pushing portion asynchronously contact the retaining portions. Damper resin is filled between the adjacent stationary sheets and rotatable sheets.

9 Claims, 6 Drawing Sheets

DAMPER APPARATUS

BACKGROUND OF THE INVENTION

1. Field of the Invention

The present invention relates to a damper apparatus, and more particularly to a damper apparatus engaging with a hinge for opening or closing a foldable electronic device gradually and securely.

2. The Related Art

As the development of modern mobile communication industry, portable electronic devices such as cellular phones, notebook computers and personal digital assistants etc., become more and more popular. Thereinto, many portable electronic devices have a function of displaying images. In order to display images as distinctly as possible, so screens of the portable electronic devices need to be designed as big as possible. But it is not convenient to carry the portable electronic device with a big screen. That is, the required big screen and the required small size of the portable electronic device are contrary. To solve the problem, foldable electronic devices have been developed. Generally, the foldable electronic device has a cover which is usually used as a screen, and a main body which is joined together with the cover by some types of hinge allowing the cover to be unfolded from the main body.

FIG. 8 shows a conventional hinge used in a foldable electronic device which has a cover and a main body. The hinge includes a cylindrical shaft 700. One end of the shaft 700 is received in a rotatable cam 600 and the other end of the shaft 700 extends to pass through a sliding cam 500, a housing 300 and a cap 200, and is located in the cap 200 through a ring 100. The rotatable cam 600 protrudes downward to form two pushing portions 601 at opposite sides thereof. The sliding cam 500 slideably received in an end of the housing 300 defines two concave grooves 501 receiving the pushing portions 601 respectively. A spring 400 is received in the housing 300 and provided to encircle the shaft 700. One end of the spring 400 is fixed on the sliding cam 500, and an opposite end of the spring 400 is mounted on the cap 200 that plugs an opposite end of the housing 300 and extends toward an inner of the housing 300. If a user would like to open the foldable electronic device, the user shall firstly unfold the cover from the main body to an angle. The force that the user provides pushes the pushing portions 601 to the top of the concave grooves 501. At the same time, the sliding cam 500 is compelled to slide toward the inner of the housing 300, and then the spring 400 is compressed. Then, the user stops acting on the foldable electronic device, and the elastic force stored in the spring 400 drives the foldable electronic device opened fully.

However, the movement that the spring 400 releases the elastic force to open the foldable electronic device is quick and uncontrolled, so the impact is produced between the cover and the main body. In this case, the foldable electronic device is easy to be broken or damaged.

SUMMARY OF THE INVENTION

Accordingly, an object of the present invention is to provide a damper apparatus engaging with a hinge for opening or closing a foldable electronic device gradually and securely.

To achieve the above object, the damper apparatus includes a stationary housing defining a cavity with an opened end and a wall opposite the opened end. A damper body rotatablely installed in the cavity of the stationary housing has a head, a cylindrical guiding portion axially protruding from the head and a pushing portion radially protruding from a portion of an outer periphery of the guiding portion. The pushing portion defines two side ends apart from each other and a plurality of rotatable sheets and a plurality of stationary sheets are respectively received in the cavity of the stationary housing and alternately disposed on the guiding portion and the pushing portion. The stationary sheets are fixed to the stationary housing. Each of the rotatable sheets protrudes inwardly to form a retaining portion. The two side ends of the pushing portion alternately engage the retaining portions when the elastic force of the hinge is released to drive the damper body rotating to open or close the foldable electronic device. At least two of the retaining portions are different in width so as to make the side end of the pushing portion asynchronously contact the retaining portions. Damper resin is filled between the adjacent stationary sheets and the rotatable sheets for restraining the pushing portion rotating.

As described above, the design of the present invention provides the damper apparatus to restrain the rotation speed of the hinge. Therefore, the foldable electronic device is open or close much more reliably.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
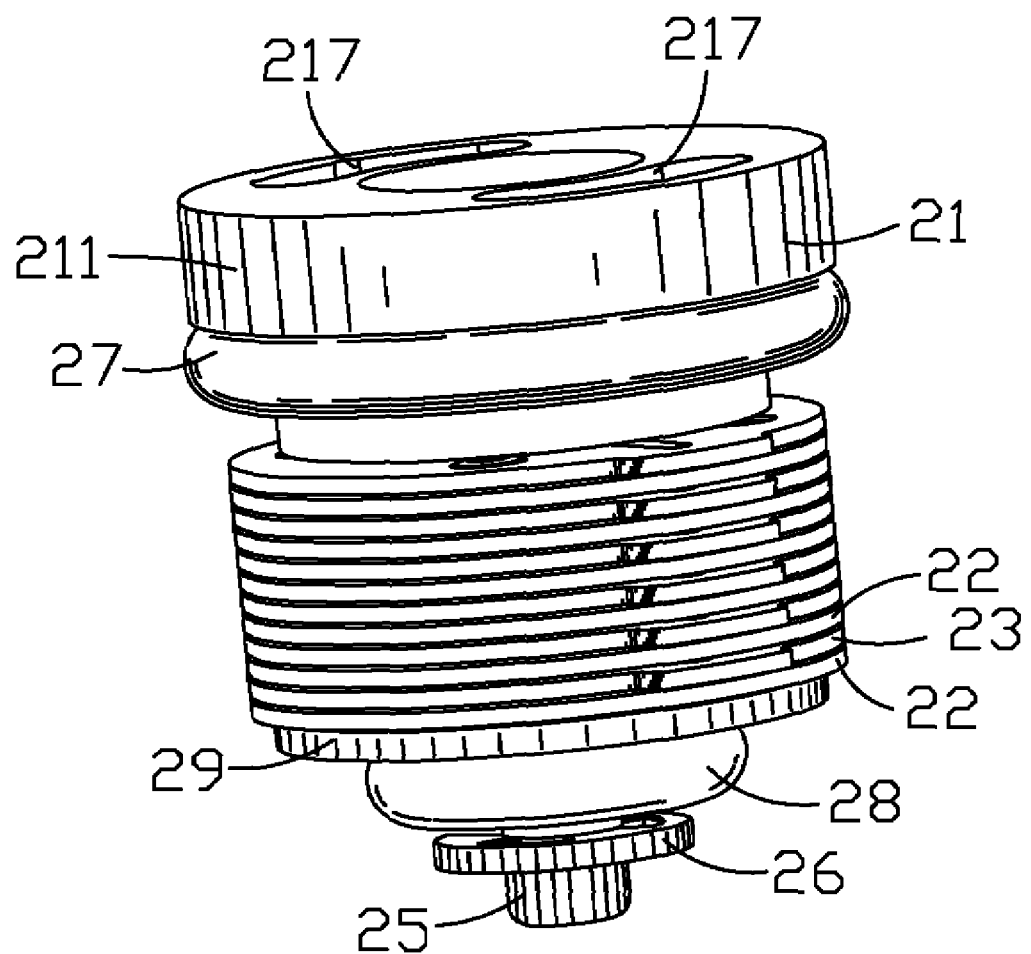
FIG. 1 is a perspective view of a damper apparatus without a stationary housing in accordance with the present invention.
Figure 2:
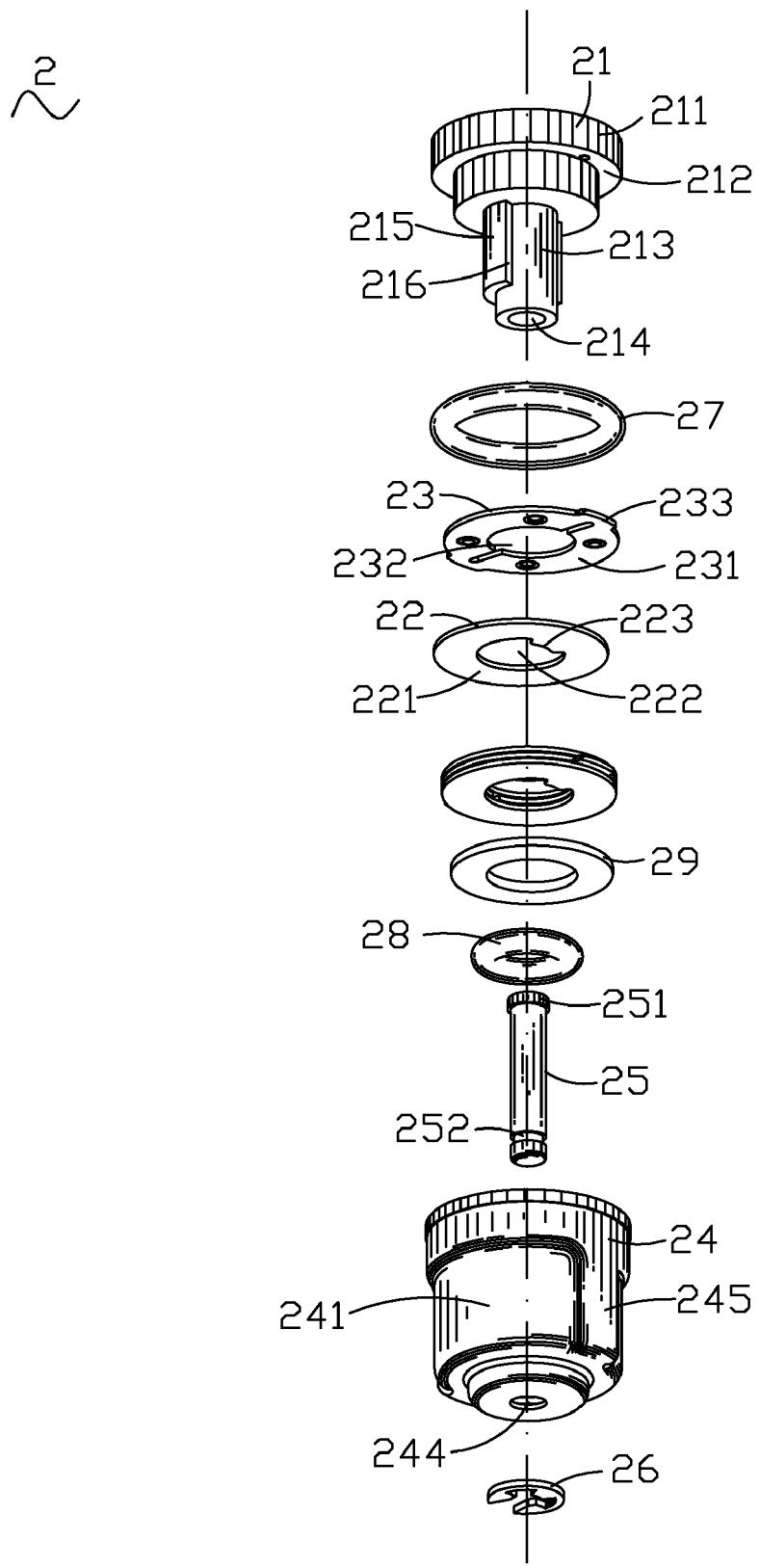
FIG. 2 is an exploded view of the damper apparatus.

Please refer to FIG. 1 and FIG. 2. A damper apparatus 2 of the present invention includes a damper body 21, a plurality of rotatable sheets 22, a plurality of stationary sheets 23, a stationary housing 24, a center pin 25, an E-shaped ring 26, a first O-shaped ring 27, a second O-shaped ring 28 and a washer 29. All of these will be described in detail hereinafter.

Figure 4:
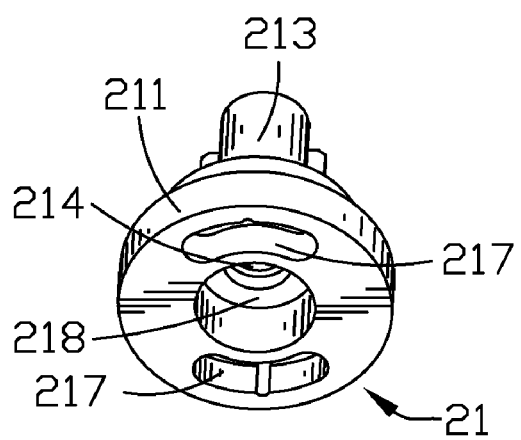
FIG. 4 is a perspective view of a damper body of the damper apparatus.
Figure 5:
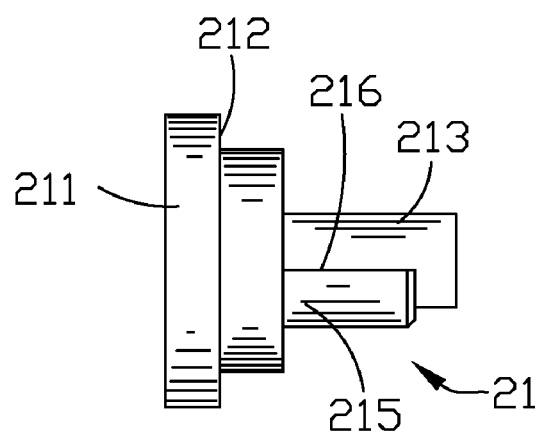
FIG. 5 is another perspective view of the damper body.

With reference to FIG. 2, FIG. 4 and FIG. 5, the damper body 21 has a discoid head 211. The discoid head 211 defines a mounting recess 212 therearound. The center of the rear surface of the discoid head 211 axially protrudes rearward to form a cylindrical guiding portion 213. A pushing portion 215 radially protrudes rearward from the rear surface of the discoid head 211 and is attached to the guiding portion 213. The pushing portion 215 has two side ends 216 defined apart from each other. Each of the side ends 216 is perpendicular to the rear surface of the discoid head 211. A first central hole 214 is defined to pass through the center of the discoid head 211 and the guiding portion 213. A front surface of the discoid head 211 defines an accommodating recess 218 at center. The accommodating recess 218 communicates with the first central hole 214 and outside. The diameter of the accommodating recess 218 is greater than the diameter of the first central hole 214. Two opposite locating grooves 217 are respectively defined at sides of the front surface of the discoid head 211 and around the accommodating recess 218.

Figure 6:
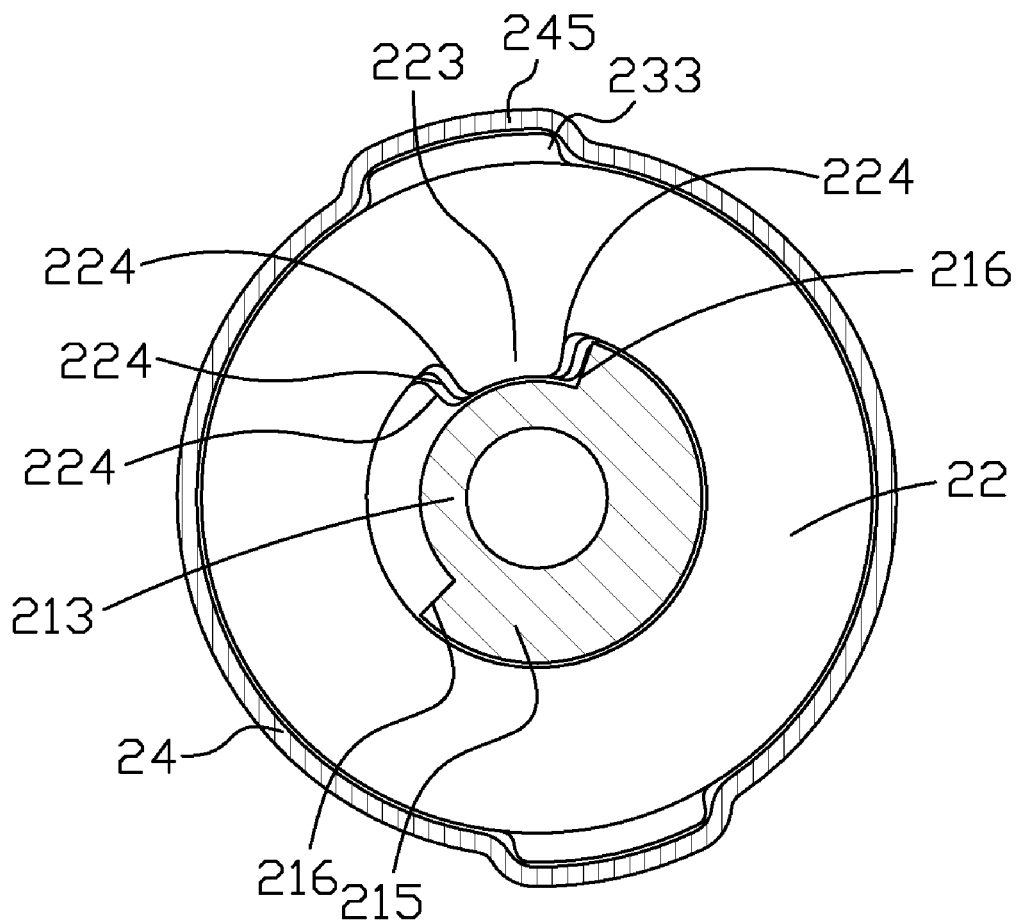
FIG. 6 is a cross-sectional view of the damper apparatus.
Figure 7:
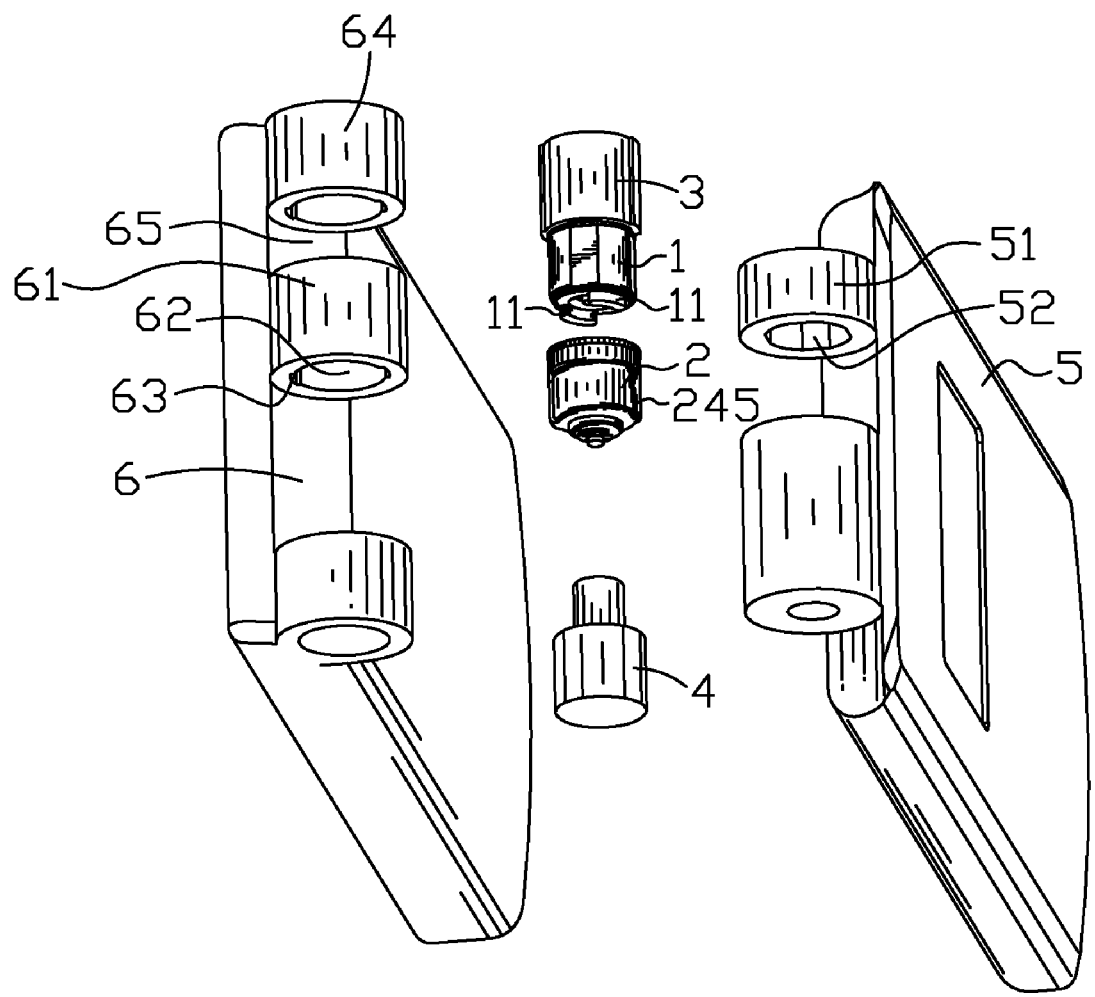
FIG. 7 is an exploded view of a foldable electronic device with a hinge and the damper apparatus.
Figure 8:
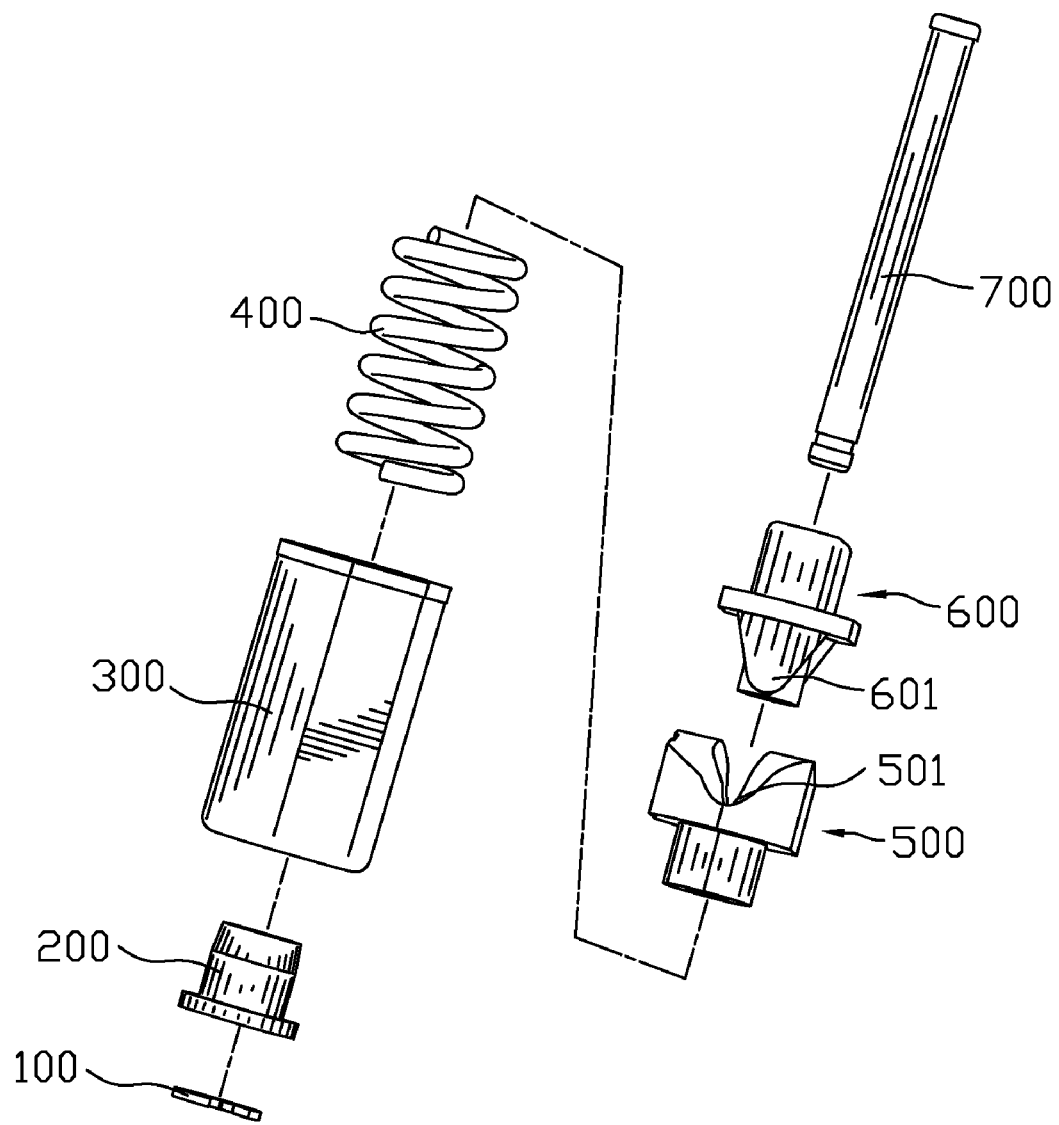
FIG. 8 is a perspective view of a prior hinge.

Referring to FIG. 2 and FIG. 6, the rotatable sheets 22 and the stationary sheets 23 are respectively received in the stationary housing 24 and alternately disposed on the guiding portion 213 and the pushing portion 215 of the damper body 21 from front to rear along the axis direction of the damper body 21. Each of the rotatable sheets 22 has a circular rotatable portion 221. The center of the rotatable portion 221 defines a first receiving hole 222. The rotatable portion 221 protrudes to an inner of the first receiving hole 222 to form a retaining portion 223. The retaining portion 223 has two opposite side surfaces 224 alternately engaging the side ends 216 of the pushing portion 215 and defining a width therebetween. The width of each of the retaining portions 223 is different and reduces along the axis direction from front to rear. The stationary sheet 23 has a circular stationary portion 231. The center of the stationary portion 231 defines a second receiving hole 232. Two opposite locating portions 233 protrude outward from sides of the stationary portion 231.

Figure 3:
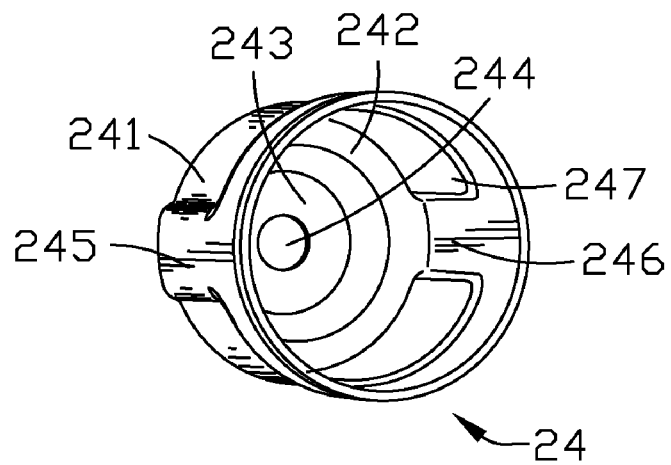
FIG. 3 is a perspective view of the stationary housing of the damper apparatus.

With reference to FIG. 2 and FIG. 3, the stationary housing 24 has a cylindrical enclosure 241. The enclosure 241 is partially closed off at a rear end and open at a front end thereof. Then a rear wall 242 is defined to seal the rear end of the enclosure 241. The center of the rear wall 242 hollows rearward to form a concave cavity 243. A second central hole 244 is defined at the center of the rear wall 242 and passes through the rear wall 242 and the concave cavity 243. An inner surface of the enclosure 241 protrudes inward to form an annular clipping portion 247 adjacent to the rear wall 242. Two opposite fixing grooves 246 are defined at an inner circumferential surface of the clipping portion 247 and axially pass through the clipping portion 247. An outer surface of the enclosure 241 axially protrudes outward to form two strips of settling portions 245 at opposite sides thereof for fixing the stationary housing 24.

Referring to FIG. 2, the center pin 25 includes a flange 251 at one end thereof. The other end of the center pin 25 defines a fixing notch 252 therearound.

With reference to FIG. 1 and FIG. 2, in assembly of the damper assembly 2, the damper body 21 is rotatablely installed in the front end of the stationary housing 24. The rotatable sheets 22 and the stationary sheets 23 are respectively alternately received in the stationary housing 24 and surrounded by the clipping portion 247, wherein the adjacent rotatable sheets 22 and stationary sheets 23 are attached to each other and the rotatable sheets 22 are rotatablely received in the stationary housing 24. The locating portions 233 of the stationary sheets 23 are located in the fixing grooves 246 of the stationary housing 24 respectively. The first receiving holes 222 of the rotatable sheets 22 and the second receiving holes 232 of the stationary sheets 23 receive the guiding portion 213 and the pushing portion 215 of the damper body 21. The rotatable sheets 22 and the stationary sheets 23 are placed between the rear surface of the discoid head 211 and the washer 29 received in the rear end of the stationary housing 24 and disposed on the guiding portion 213 and the pushing portion 215. The first O-shaped ring 27 is disposed in the mounting recess 212 of the damper body 21. The second O-shaped ring 28 disposed on the guiding portion 213 is received in the concave cavity 243 and against the washer 29. The center pin 25 passes through the first central hole 214 of the damper body 21, the first O-shaped ring 27, the second receiving holes 232 of the stationary sheets 23, the first receiving holes 222 of the rotatable sheets 22, the washer 29, the second O-shaped ring 28 and the second central hole 244 of the stationary housing 24. The flange 251 of the center pin 25 is fixed in the accommodating recess 218 of the damper body 21. The fixing notch 252 is exposed out of the second central hole 244 of the stationary housing 24 and the center pin 25 is fastened together with the stationary housing 24 through the E-shaped ring 26 inserted in the fixing notch 252. In a preferred embodiment of the present invention, damper resin is filled between the adjacent rotatable sheets 22 and stationary sheets 23. The first O-shaped ring 27 and the second O-shaped ring 28 prevent the damper resin leakage.

Please refer to FIG. 1, FIG. 2, FIG. 6 and FIG. 7. In use, the damper apparatus 2 engaging with a hinge 1 is assembled on a foldable electronic device including a cover 5 and a main body 6. The cover 5 includes a first locating barrel 51 defining a first engaging hole 52 passing therethrough. The main body 6 includes a second locating barrel 61 defining a second engaging hole 62 passing therethrough. Two opposite fixing recesses 63 axially pass through an inner surface of the second locating barrel 61 and communicate with the second engaging hole 62. A mounting chamber 64 is defined on the main body 6. The mounting chamber 64 and the second locating barrel 61 are defined abreast and on the same line. A mounting space 65 is defined between the mounting chamber 64 and the second locating barrel 61. The hinge 1 adapted for producing and releasing an elastic force by rotating fixes a pair of connecting members 11 at a rear end thereof. The connecting members 11 are respectively inserted in the locating grooves 217 of the damper body 21, and then the hinge 1 and the damper apparatus 2 are assembled together. An opposite end of the hinge 1 rotatablely connects with a cylindrical positioning member 3 located in the mounting chamber 64 of the main body 6. The hinge 1 is fixed in the first engaging hole 52 of the cover 5 and the damper apparatus 2 is mounted in the second engaging hole 62 of the main body 6. The settling portions 245 of the stationary housing 24 are respectively located in the fixing recesses 63 of the main body 6. The first locating barrel 51 of the cover 5 is mounted at the mounting space 65 of the main body 6. A pivotal pillar 4 pivotally connects the cover 5 and the main body 6 and thus the cover 5 is rotatablely connected to the main body 6.

When a user wants to open/close the foldable electronic device, the user firstly opens/closes the cover 5 from/to the main body 6 partly. The force the user provides drives the hinge 1 rotating in order to store elastic force therein. Meanwhile, the connecting members 11 of the hinge 1 bring the damper body 21 of the damper apparatus 2 rotating. The guiding portion 213 and the pushing portion 215 of the damper body 21 rotate in the first receiving holes 222 of the rotatable sheets 22 and the second receiving holes 232 of the stationary sheets 23. When the cover 5 rotates at a certain angle, the user stops acting on the cover 5. The elastic force stored in the hinge 1 drives the hinge 1 rotating continually. So the connecting members 11 bring the damper body 21 rotating continually until the foldable electronic device is open/close fully. In the process of the foldable electronic device being open fully with the help of the elastic force stored in the hinge 1, one of the two side ends 216 of the pushing portion 215 contacts one of the two side surfaces 224 of each of the retaining portions 223. Because of the different width defined between the two side surfaces 224 of the retaining portions 223, the side end 216 of the pushing portion 215 contacts the side surface 224 of the retaining portions 223 one by one for restraining the open speed of the cover 5 from the main body 6. Contrary, in the process of the foldable electronic device being close fully with the help of the elastic force stored in the hinge 1, the other side end 216 of the pushing portion 215 contacts the other side surface 224 of the retaining portions 223 one by one for restraining the close speed of cover 5 to the main body 6. Then the damper apparatus 2 restrains the rotation speed of the hinge 1. Therefore, the cover 5 is open/close from/to the main body 6 of the foldable electronic device smoothly and securely.

As described above, the design of the present invention provides the damper apparatus 2 to restrain the rotation speed of the hinge 1. Therefore, the foldable electronic device is open/close much more reliably.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A damper apparatus adapted to be connected coaxially with a hinge used in a foldable electronic device, comprising:
   a stationary housing defining a cavity with an opened end and a wall opposite the opened end;
   a damper body rotatably installed in the cavity of the stationary housing, the damper body having a head, a cylindrical guiding portion axially protruding from the head, and a pushing portion radially protruding from a portion of an outer periphery of the guiding portion, the pushing portion having two side ends apart from each other; and
   a plurality of rotatable sheets and a plurality of stationary sheets respectively received in the cavity of the stationary housing and alternately disposed on the guiding portion and the pushing portion, the stationary sheets being fixed to the stationary housing, each of the rotatable sheets protruding inwardly to form a retaining portion, the two side ends of the pushing portion alternately engaging the retaining portions when the elastic force of the hinge being released to drive the damper body rotating to open or close the foldable electronic device, at least two of the retaining portions being different in width so as to make the side end of the pushing portion asynchronously contact the retaining portions, damper resin being filled between the adjacent stationary sheets and rotatable sheets for restraining the pushing portion rotating.

2. The damper apparatus as claimed in claim 1, wherein the pushing portion is of open ring-shape.

3. The damper apparatus as claimed in claim 1, wherein all of the retaining portions are different in width.

4. The damper apparatus as claimed in claim 3, wherein the widths of all the retaining portions reduce or increase gradually along the damper body.

5. The damper apparatus as claimed in claim 1, further comprising a washer received in the cavity of the stationary housing and disposed on the guiding portion for insulating the rotatable sheets and the stationary sheets from the wall of the stationary housing.

6. The damper apparatus as claimed in claim 1, wherein the head of the damper body defines a mounting recess therearound, a ring is disposed in the mounting recess to prevent the damper resin leakage.

7. The damper apparatus as claimed in claim 1, wherein the head of the damper body defines a first central hole passing through the guiding portion, the wall of the stationary housing axially defines a second central hole passing therethrough, a center pin passes through the first central hole and the second central hole and is fixed together with the wall of the stationary housing.

8. The damper apparatus as claimed in claim 7, wherein an inside of the wall is concaved to form a concave cavity, a ring is received in the concave cavity and disposed on the guiding portion to prevent the damper resin leakage.

9. A damper apparatus adapted to be connected coaxially with a hinge used in a foldable electronic device, comprising:
   a stationary housing defining a wall at an end thereof and opening at an opposite end thereof;
   a damper body rotatably installed in the stationary housing, the damper body having a head, the head protruding to form a pushing portion which has two side ends apart from each other; and
   a plurality of rotatable sheets and a plurality of stationary sheets respectively received in the stationary housing and alternately disposed on the pushing portion, the stationary sheets being fixed to the stationary housing, each of the rotatable sheets protruding inwardly to form a retaining portion, the two side ends of the pushing portion alternately engaging the retaining portions when the elastic force of the hinge being released to drive the damper body rotating to open or close the foldable electronic device, at least two of the retaining portions being different in width so as to make the side end of the pushing portion asynchronously contact the retaining portions, damper resin being filled between the adjacent stationary sheets and rotatable sheets for restraining the pushing portion rotating.

* * * * *